(12) United States Patent
Shafran et al.

(10) Patent No.: US 8,028,923 B2
(45) Date of Patent: Oct. 4, 2011

(54) ELECTRONIC INLAY STRUCTURE AND METHOD OF MANUFACTURE THEREOF

(75) Inventors: Guy Shafran, Rosh-Pina (IL); Oded Bashan, Rosh-Pina (IL)

(73) Assignee: Smartrac IP B.V., Amsterdam (NL)

( * ) Notice: Subject to any disclaimer, the term of this patent is extended or adjusted under 35 U.S.C. 154(b) by 884 days.

(21) Appl. No.: 11/985,534

(22) Filed: Nov. 14, 2007

(65) Prior Publication Data
US 2009/0123704 A1     May 14, 2009

(51) Int. Cl.
*G06K 19/05*     (2006.01)
(52) U.S. Cl. ........................................ 235/492; 235/487
(58) Field of Classification Search .................. 235/492, 235/487, 494
See application file for complete search history.

(56) References Cited

U.S. PATENT DOCUMENTS

| | | |
|---|---|---|
| 3,674,914 A | 7/1972 | Burr |
| 3,823,403 A | 7/1974 | Walter et al. |
| 3,981,076 A | 9/1976 | Nicolas et al. |
| 4,065,850 A | 1/1978 | Burr et al. |
| 4,417,413 A | 11/1983 | Hoppe et al. |
| 4,450,623 A | 5/1984 | Burr |
| 4,776,509 A | 10/1988 | Pitts et al. |
| 5,025,550 A | 6/1991 | Zirbes et al. |
| 5,186,378 A | 2/1993 | Alfaro |
| 5,223,851 A | 6/1993 | Hadden et al. |
| 5,240,166 A | 8/1993 | Fontana et al. |
| 5,250,759 A | 10/1993 | Watson |
| 5,285,191 A | 2/1994 | Reeb |
| 5,378,857 A | 1/1995 | Swailes |
| 5,448,110 A | 9/1995 | Tuttle et al. |
| 5,572,410 A | 11/1996 | Gustafson |
| 5,606,488 A | 2/1997 | Gustafson |
| 5,606,791 A | 3/1997 | Fougere et al. |
| 5,623,138 A | 4/1997 | Lee |
| 5,705,852 A | 1/1998 | Orihara et al. |
| 5,741,392 A | 4/1998 | Droz |
| 5,809,633 A | 9/1998 | Mundigi et al. |

(Continued)

FOREIGN PATENT DOCUMENTS
AT     193136     6/2000
(Continued)

OTHER PUBLICATIONS

R.S. Keogh, "Automated fabrication of high precision planar coils", Electrical Electronics Insulation, Conference, 1995 and Electrical Manufacturing & Coil Winding Conference, Proc. pp. 517-519, Sep. 18-21, 1995.

(Continued)

*Primary Examiner* — Daniel St. Cyr
(74) *Attorney, Agent, or Firm* — Abelman, Frayne & Schwab

(57) ABSTRACT

An electronic inlay structure including first and second sheets of an inlay substrate arranged in generally side to side, spaced parallel arrangement, having a gap therebetween, a flexible web material arranged to overlie the gap and edges of the first and second sheets of the inlay structure adjacent the gap, third and fourth sheets arranged in registration with the first and second sheets respectively, over the first and second sheets of the inlay substrate and partially over the flexible web material and bonded thereto, electronic circuitry associated with at least one of the first, second, third and fourth sheets and lamination enclosing the first, second, third and fourth sheets, the electronic circuitry and the web material together to create the inlay structure.

10 Claims, 20 Drawing Sheets

U.S. PATENT DOCUMENTS

| | | |
|---|---|---|
| 5,862,039 A | 1/1999 | Oertel |
| 6,023,837 A | 2/2000 | Finn |
| 6,081,025 A | 6/2000 | Prancz |
| 6,088,230 A | 7/2000 | Finn et al. |
| 6,233,818 B1 | 5/2001 | Finn |
| 6,378,774 B1 | 4/2002 | Emori et al. |
| 6,604,686 B1 | 8/2003 | Taban |
| 6,607,135 B1 | 8/2003 | Hirai et al. |
| 6,626,364 B2 | 9/2003 | Taban |
| 6,628,240 B2 | 9/2003 | Amadeo |
| 6,698,089 B2 | 3/2004 | Finn et al. |
| 6,719,206 B1 | 4/2004 | Bashan et al. |
| 6,857,552 B2 | 2/2005 | Wong |
| 6,881,605 B2 | 4/2005 | Lee et al. |
| 7,170,391 B2 | 1/2007 | Lane et al. |
| 7,204,427 B2 | 4/2007 | Patrice |
| 7,224,278 B2 | 5/2007 | Phaneuf et al. |
| 7,240,847 B2 | 7/2007 | Puschner et al. |
| 7,243,840 B2 * | 7/2007 | Bason et al. ............ 235/380 |
| 7,269,021 B2 | 9/2007 | Gundlach et al. |
| 7,271,039 B2 | 9/2007 | Halope |
| 7,278,580 B2 | 10/2007 | Jones et al. |
| 2003/0085285 A1 | 5/2003 | Luu |
| 2004/0206799 A1 | 10/2004 | Wong |
| 2004/0245347 A1 | 12/2004 | Shibamoto et al. |
| 2005/0202595 A1 | 9/2005 | Yonehara et al. |
| 2005/0212690 A1 | 9/2005 | Nishikawa |
| 2006/0151614 A1 | 7/2006 | Nishizawa et al. |
| 2007/0085121 A1 | 4/2007 | Mikura et al. |
| 2007/0090387 A1 | 4/2007 | Daniels et al. |
| 2007/0215271 A1 | 9/2007 | McClintic |
| 2007/0235548 A1 | 10/2007 | Singleton |

FOREIGN PATENT DOCUMENTS

| | | |
|---|---|---|
| AU | 709049 | 8/1999 |
| CA | 2245775 | 8/1997 |
| CA | 2449413 | 8/1997 |
| CN | 1210602 | 3/1999 |
| DE | 4205084 | 9/1993 |
| DE | 4307064 | 9/1994 |
| DE | 4408124 | 9/1995 |
| DE | 4410732 | 10/1995 |
| DE | 4421607 | 1/1996 |
| DE | 19619771 | 8/1997 |
| DE | 19620242 | 11/1997 |
| EP | 0217019 | 7/1986 |
| EP | 0535433 | 4/1993 |
| EP | 0595549 | 10/1993 |
| EP | 0615285 | 9/1994 |
| EP | 0689164 | 6/1995 |
| EP | 0689164 | 12/1995 |
| EP | 0 880 754 | 2/1997 |
| EP | 0 894 303 | 4/1997 |
| ES | 2146989 | 8/2000 |
| FR | 2555007 | 5/1985 |
| GB | 624369 | 6/1949 |
| GB | 1352557 | 5/1974 |
| JP | 62008313 | 1/1987 |
| JP | 60251861 | 10/1993 |
| JP | 06001096 | 1/1994 |
| JP | 6351194 | 12/1994 |
| JP | 62111821 | 2/2000 |
| JP | 2004-348235 | 12/2004 |
| KR | 0373063 | 5/2003 |
| WO | WO 91/16718 | 10/1991 |
| WO | WO 92/22827 | 12/1992 |
| WO | WO 93/18493 | 9/1993 |
| WO | WO 93/20537 | 10/1993 |
| WO | WO 95/26538 | 10/1995 |
| WO | WO 97/04415 | 2/1997 |
| WO | WO 97/30418 | 8/1997 |
| WO | WO 00/26885 | 5/2000 |
| WO | WO 2005/104584 | 11/2005 |
| WO | 2006/052422 | 5/2006 |
| WO | WO 2006/052422 | 5/2006 |
| WO | WO 2007/085115 | 8/2007 |

OTHER PUBLICATIONS

"Shrouds of Time, The history of RFID", An AIM Publication, Oct. 1, 2001.

* cited by examiner

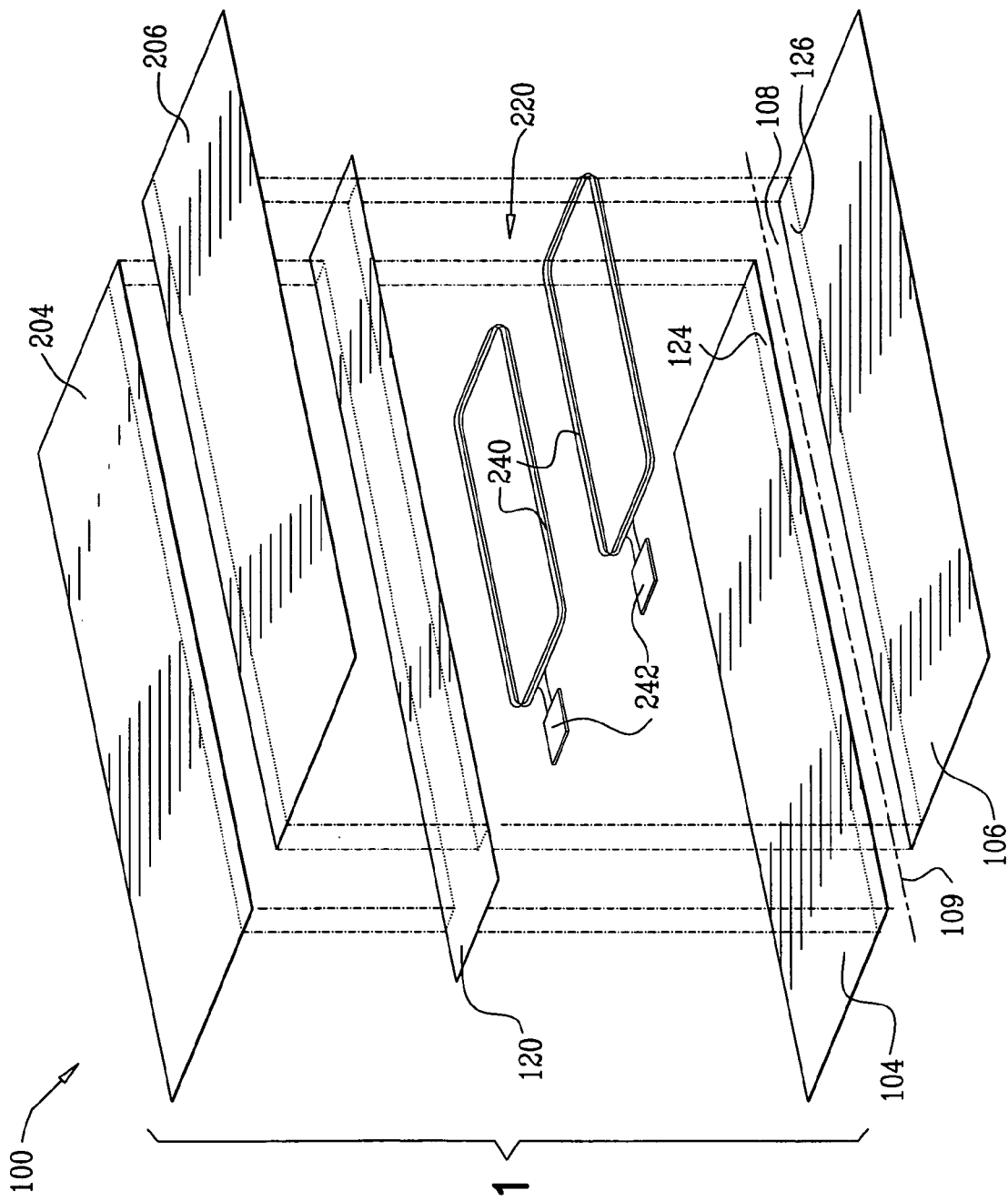

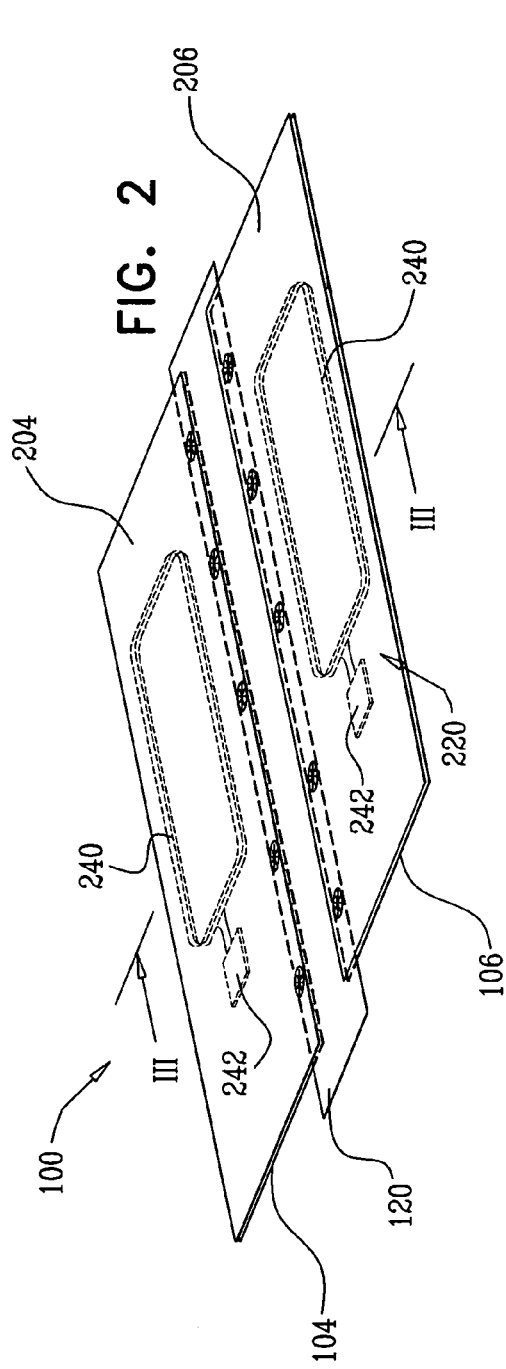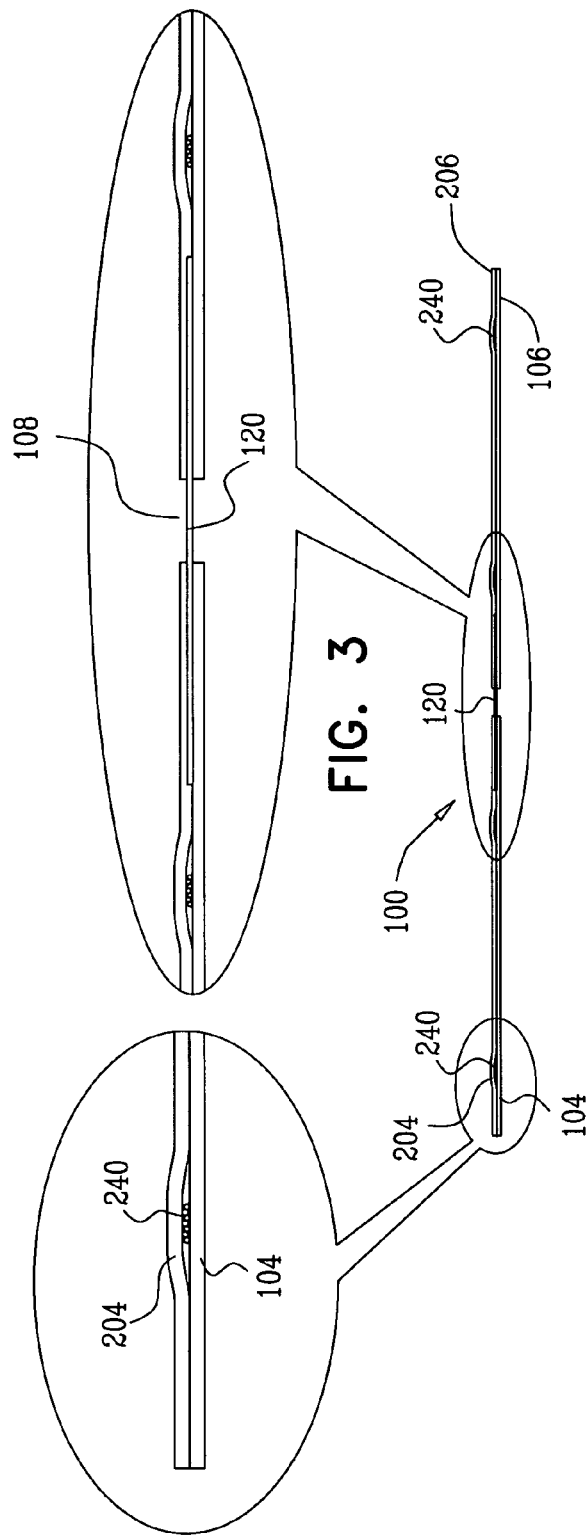

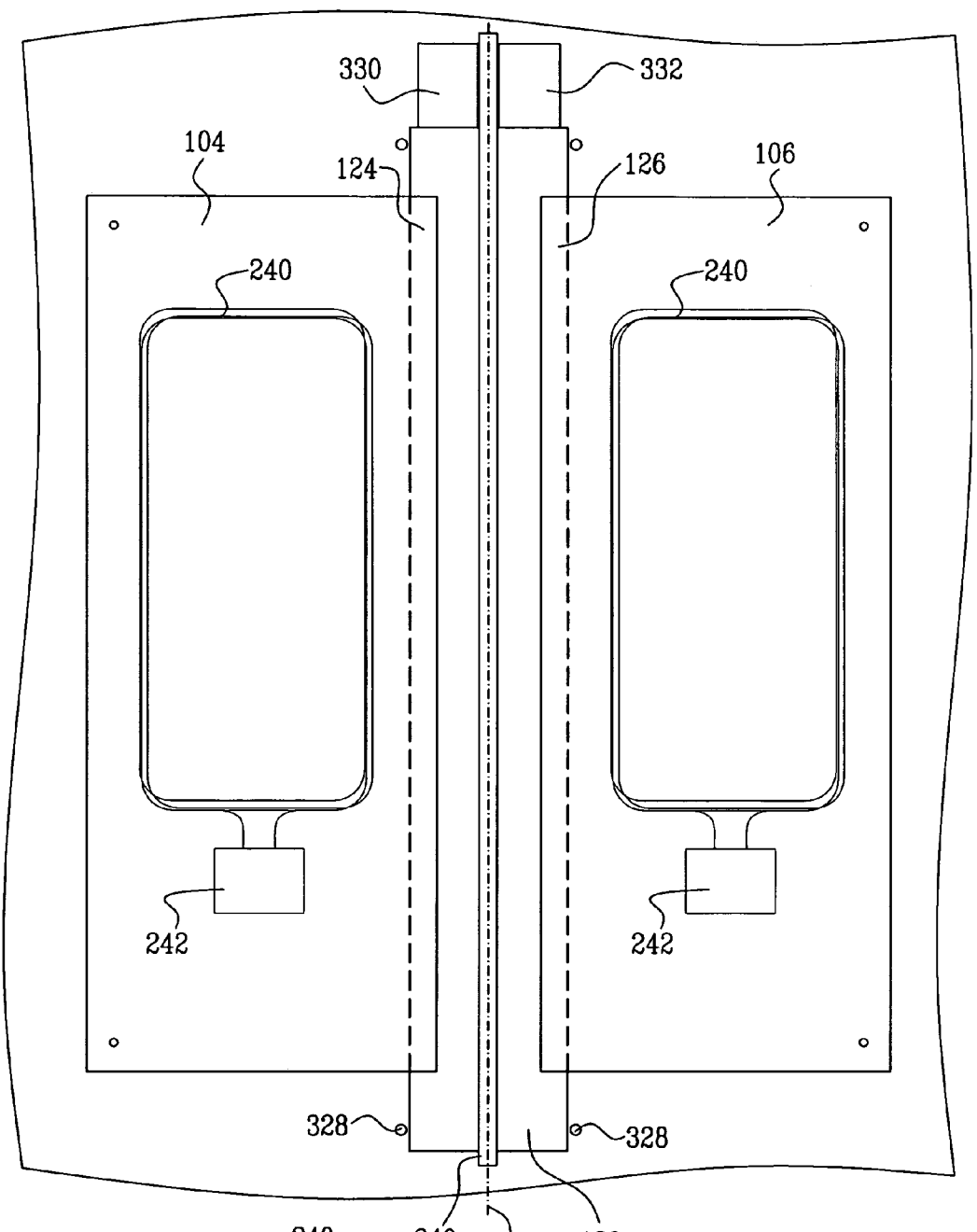
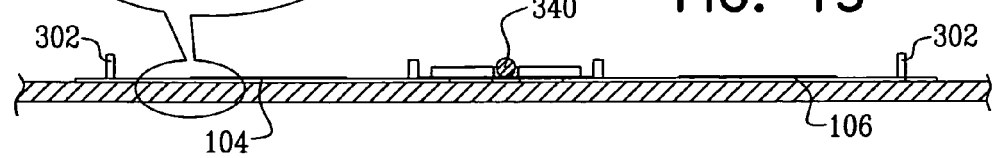

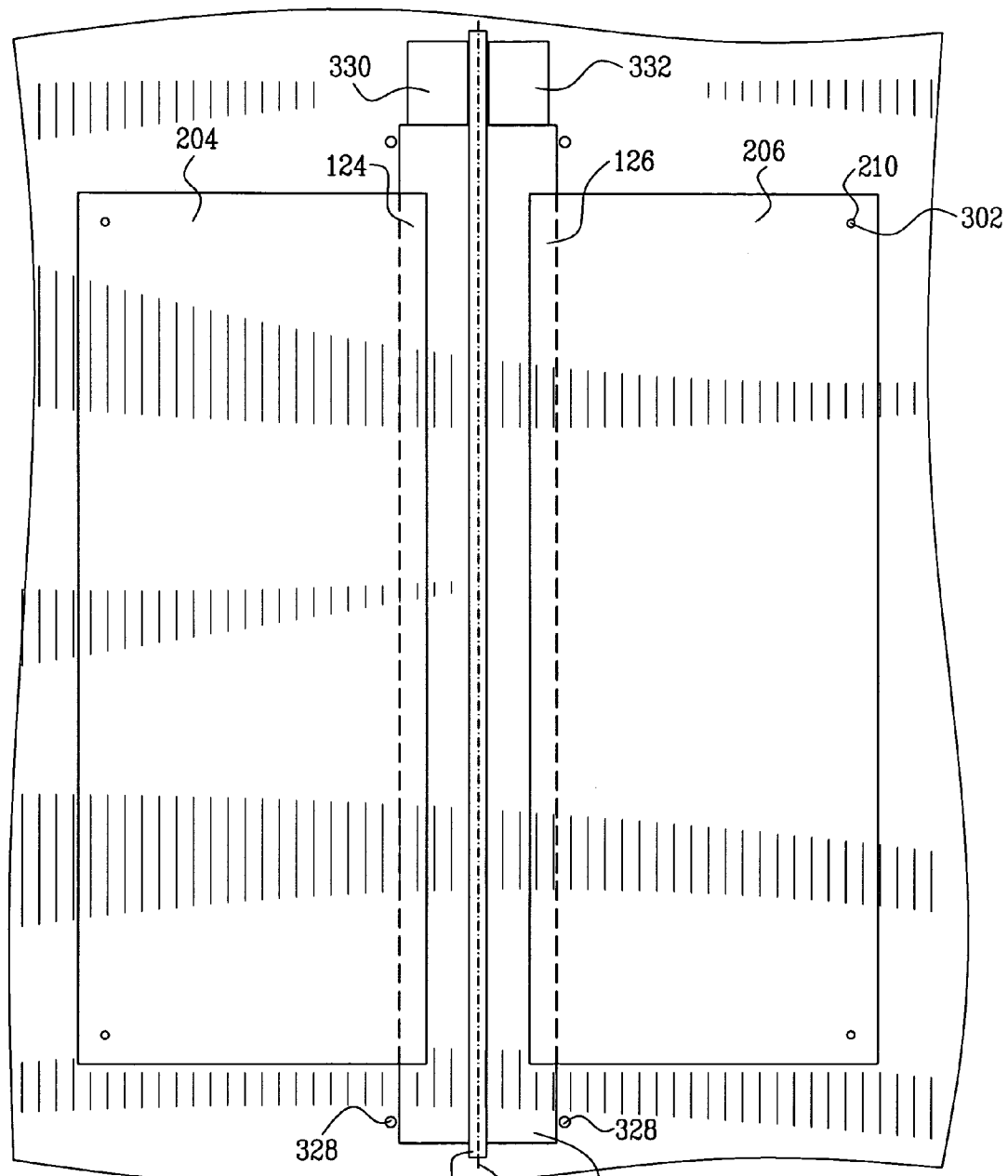
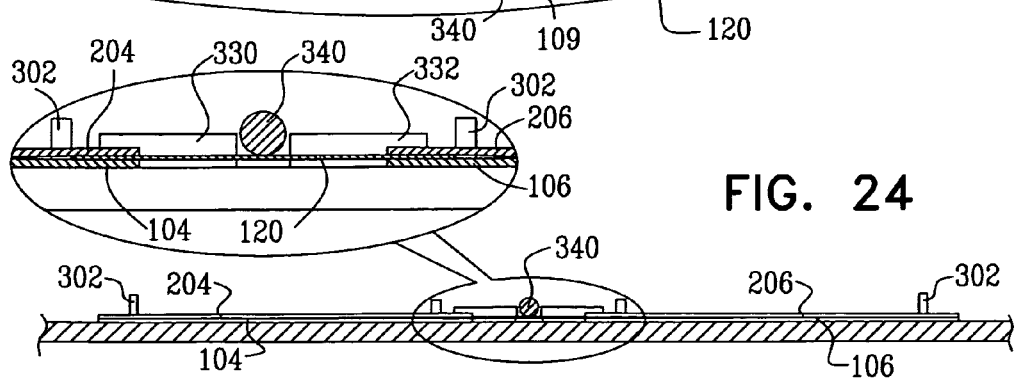

ELECTRONIC INLAY STRUCTURE AND METHOD OF MANUFACTURE THEREOF

FIELD OF THE INVENTION

The present invention relates to methods of manufacture of inlay structures, such as inlay structures useful in electronic identification products as well as inlay structures and electronic identification products produced thereby.

BACKGROUND OF THE INVENTION

The following patent publications are believed to represent the current state of the art:
U.S. Pat. Nos. 7,278,580; 7,271,039; 7,269,021; 7,243,840; 7,240,847 and 7,204,427.

SUMMARY OF THE INVENTION

The present invention seeks to provide alternative methods of manufacture of inlay structures, such as inlay structures useful in electronic identification products as well as alternative inlay structures and electronic identification products produced thereby.

There is thus provided in accordance with a preferred embodiment of the present invention an electronic inlay structure including first and second sheets of an inlay substrate arranged in generally side to side, spaced parallel arrangement, having a gap therebetween, a flexible web material arranged to overlie the gap and edges of the first and second sheets of the inlay structure adjacent the gap, third and fourth sheets arranged in registration with the first and second sheets respectively, over the first and second sheets of the inlay substrate and partially over the flexible web material and bonded thereto, electronic circuitry associated with at least one of the first, second, third and fourth sheets and lamination enclosing the first, second, third and fourth sheets, the electronic circuitry and the web material together to create the inlay structure.

Preferably, the inlay substrate material is selected from the group consisting of coated paper, TESLIN®, PVC, polycarbonate, PET-G, PETF and ABS.

Preferably, at least part of the electronic circuitry is located on any of the first, second, third and fourth sheets of the inlay substrate. Additionally or alternatively, the electronic circuitry includes at least one wireless communication antenna which is at least partially embedded in at least one of the first, second, third and fourth sheets.

Preferably, the electronic circuitry includes a smart card chip providing identification functionality.

There is also provided in according with another preferred embodiment of the present invention a method of manufacture of an electronic inlay structure, the method including arranging first and second sheets of an inlay substrate in generally side to side, spaced parallel arrangement, having a gap therebetween, arranging a flexible web material to overlie the gap and edges of the first and second sheets of the inlay structure adjacent the gap, arranging third and fourth sheets of an inlay substrate in registration with the first and second sheets respectively, over the first and second sheets of the inlay substrate and partially over the flexible web material, bonding the first and third sheets together at locations where they overlie the flexible web material; bonding the second and fourth sheets together at locations where they overlie the flexible web material; associating electronic identification circuitry with at least one of the first, second, third and forth sheets and laminating the first, second, third and fourth sheets, the electronic circuitry and the web material together to create the inlay structure.

Preferably, the inlay substrate material is selected from the group consisting of coated paper, TESLIN®, PVC, polycarbonate, PET-G, PETF and ABS.

BRIEF DESCRIPTION OF THE DRAWINGS

The present invention will be understood and appreciated more fully from the following detailed description, taken in conjunction with the drawings in which:

FIGS. 1, 2 and 3 are simplified exploded view, assembled view and sectional illustrations of an inlay structure, useful in an electronic identification product, constructed and operative in accordance with a preferred embodiment of the present invention;

FIGS. 14 and 15 are, respectively, a plan view corresponding to FIG. 13 and a sectional illustration taken along lines XV-XV of FIG. 13;

FIGS. 23 and 24 are, respectively, a plan view corresponding to FIG. 22 and a sectional illustration taken along lines XXIV-XXIV of FIG. 22;

DETAILED DESCRIPTION OF A PREFERRED EMBODIMENT

Figure 4:
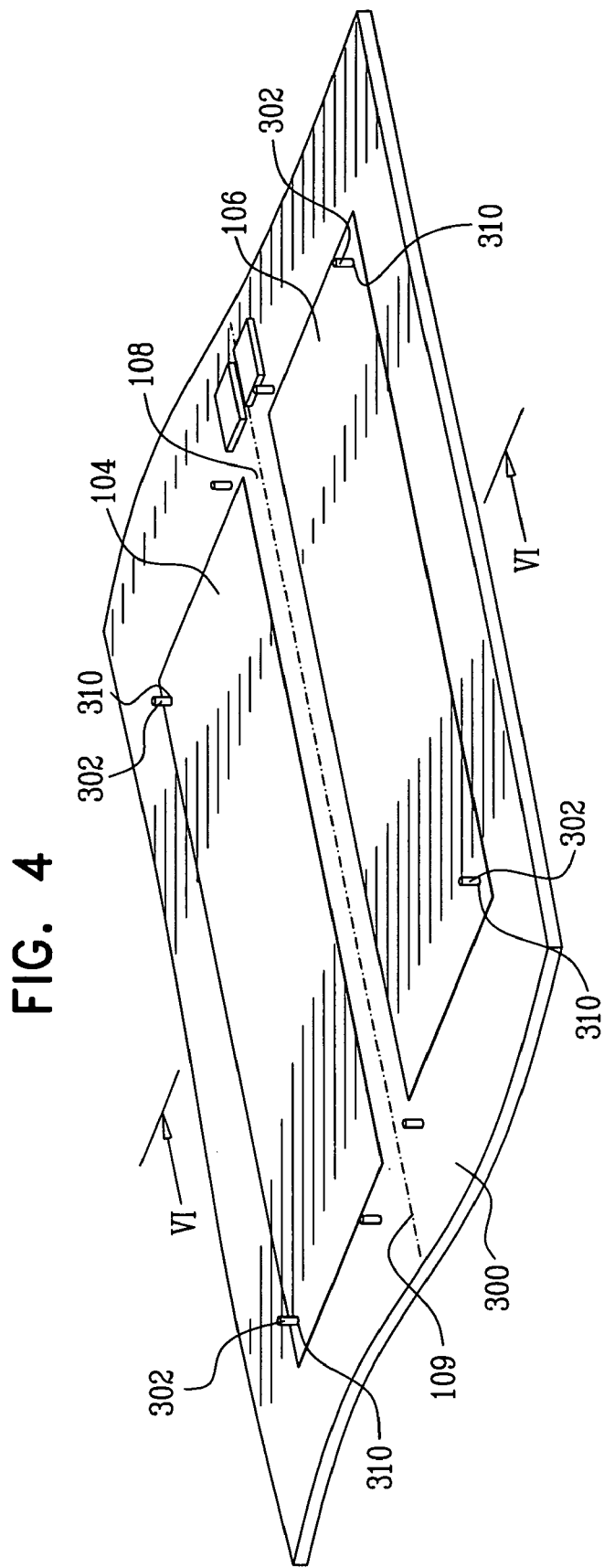
FIG. 4 is a simplified pictorial illustration of an initial step in a method of manufacture of the inlay structure of FIGS. 1-3.

Reference is now made to FIGS. 1-3, which illustrate an inlay structure 100, useful in an electronic identification product, such as an electronic passport, constructed and operative in accordance with a preferred embodiment of the present invention. As seen in FIGS. 1-3, the inlay structure 100 comprises first and second sheets 104 and 106 of an inlay substrate, such as coated paper, TESLIN®, PVC, polycarbonate, PET-G, PETF and ABS or any other suitable substrate, which are arranged in generally side to side, spaced parallel arrangement and having a gap 108 therebetween, which is bisected by an axis 109.

A strip of flexible web material 120, such as for example a PET based web strip, preferably is placed over sheets 104 and 106 so as to overlie gap 108 and respective edges 124 and 126 of first and second sheets 104 and 106 of the inlay structure adjacent gap 108.

Third and fourth sheets 204 and 206 of an inlay substrate, such as coated paper, TESLIN®, PVC, polycarbonate, PET-G, PETF and ABS or any other suitable substrate, are preferably arranged in precise registration over respective sheets 104 and 106 and partially over strip 120.

Electronic identification circuitry 220 is disposed intermediate first and third sheets 104 and 204 and/or between second and fourth sheets 106 and 206. The electronic identification circuitry 220 preferably includes a wireless antenna 240 electrically connected to a chip module 242 containing a smart card chip or any other suitable electronic circuitry.

Figure 5:
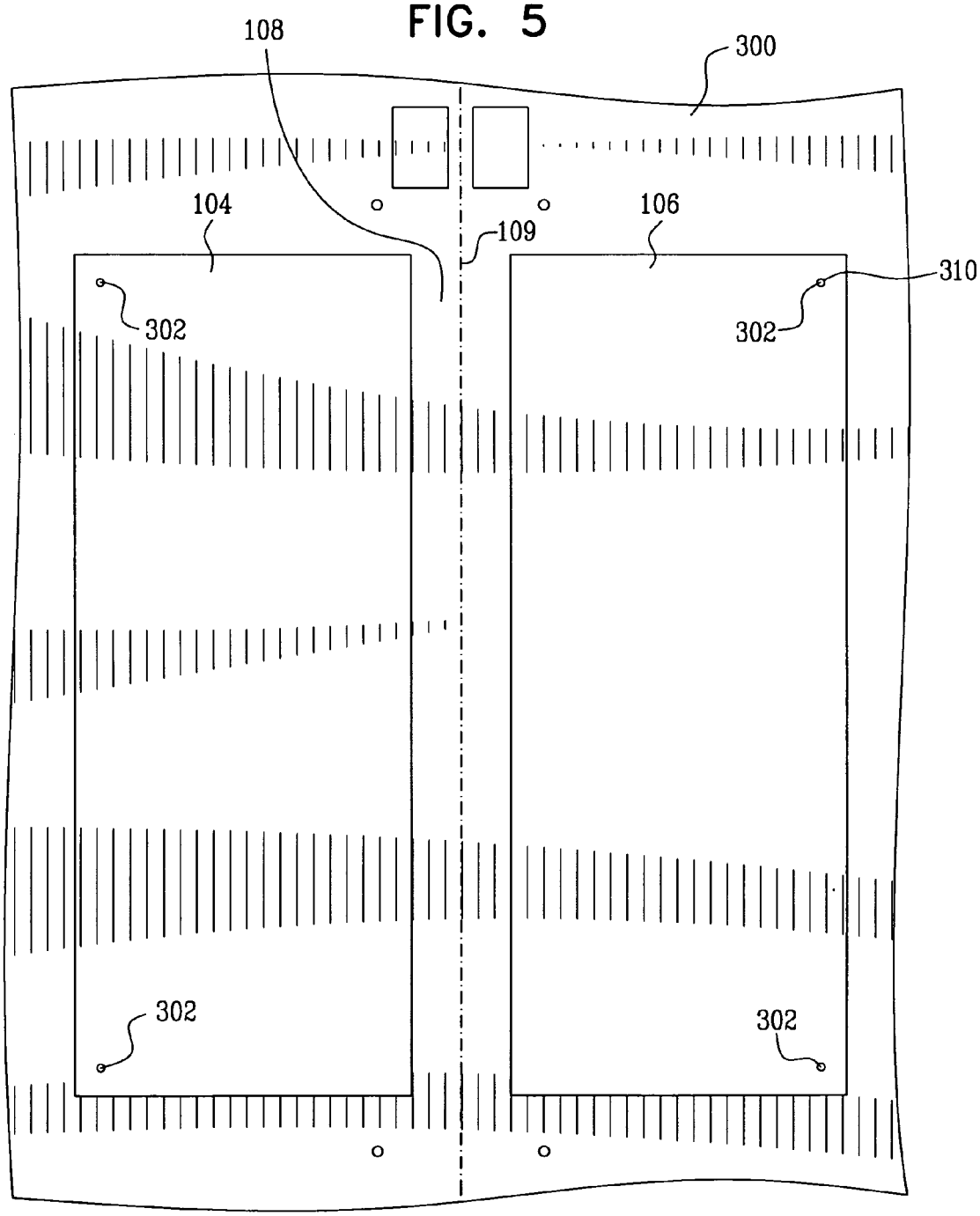
FIGS. 5 and 6 are, respectively, a plan view corresponding to FIG. 4 and a sectional illustration taken along lines VI-VI of FIG. 4.
Figure 6:
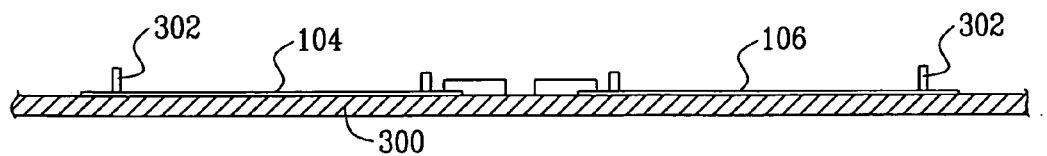

Reference is now made to FIG. 4, which illustrates an initial step in a method of manufacture of inlay structure 100 of FIGS. 1-3, and to FIGS. 5 and 6, which are respectively, a plan view corresponding to FIG. 4 and a sectional illustration taken along lines VI-VI of FIG. 4. It is to be appreciated that although a non-automated method of manufacture is described hereinbelow for the sake of conciseness and simplicity, the manufacture of inlay structure 100 of FIGS. 1-3 may alternatively be automated, using suitable known manufacturing techniques.

A generally planar assembly surface 300 is preferably provided with a plurality of upstanding positioning pins 302. As seen in FIGS. 4-6, first and second sheets 104 and 106 of an inlay substrate, such as coated paper, TESLIN®, PVC, polycarbonate, PET-G, PETF and ABS or any other suitable substrate, are arranged in generally side to side, spaced parallel arrangement on assembly surface 300, having gap 108 therebetween, which is bisected by axis 109. The sheets 104 and 106 of the inlay substrate are preferably formed with perforations 310 at locations corresponding to those of upstanding positioning pins 302 and are located such that pins 302 extend through corresponding perforations 310, so as to provide precise location of sheets 104 and 106.

Figure 7:
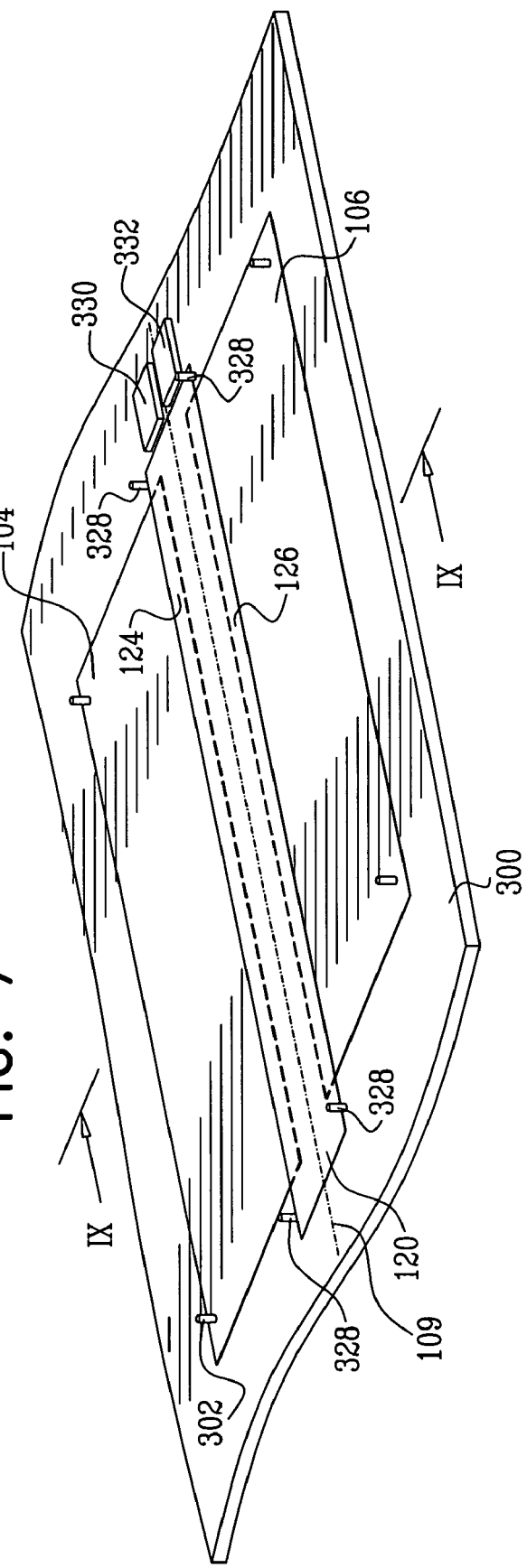
FIG. 7 is a simplified pictorial illustration of a further step in the method of manufacture of the inlay structure of FIGS. 1-3.
Figure 8:
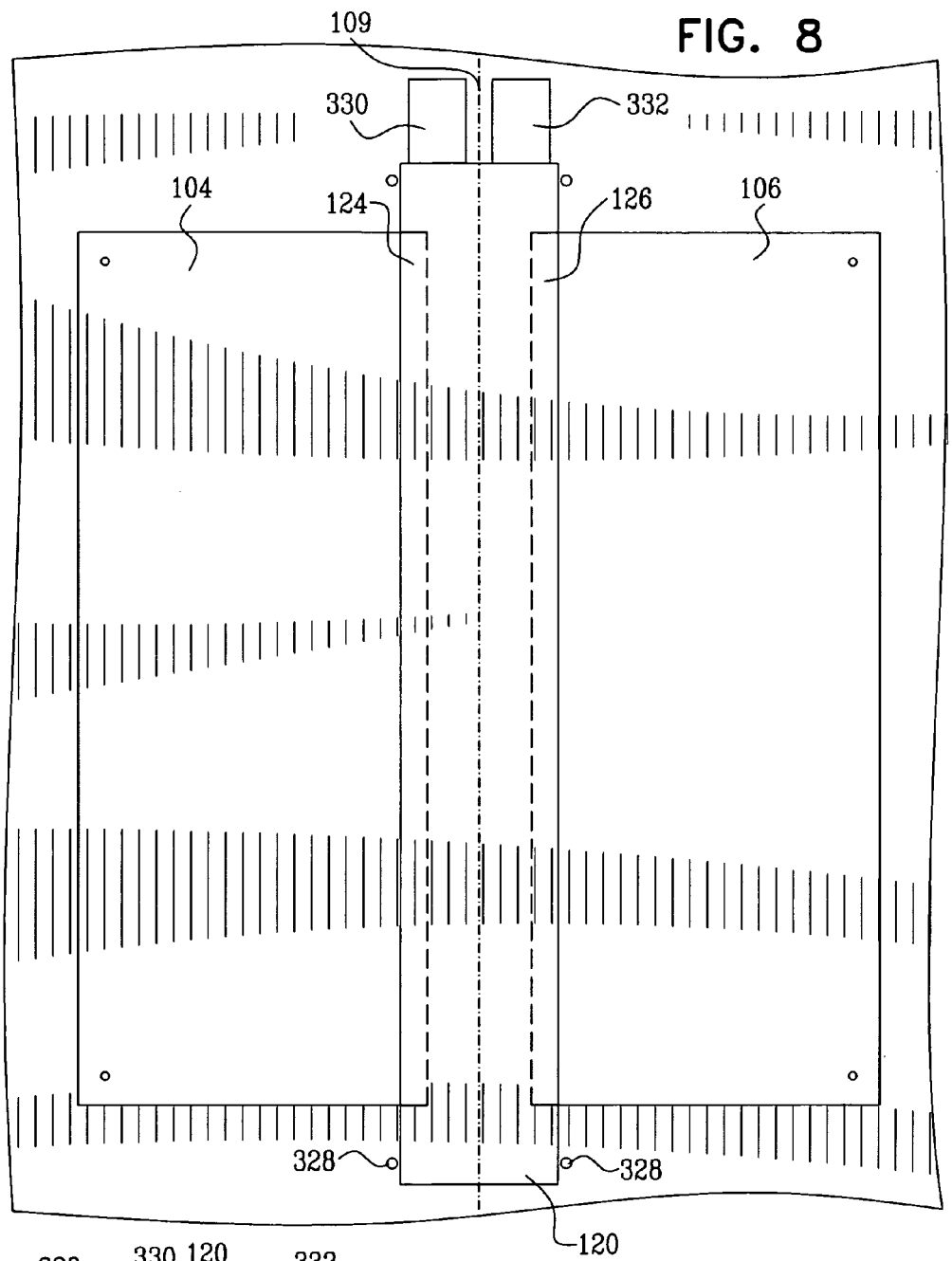
FIGS. 8 and 9 are, respectively, a plan view corresponding to FIG. 7 and a sectional illustration taken along lines IX-IX of FIG. 7.
Figure 9:
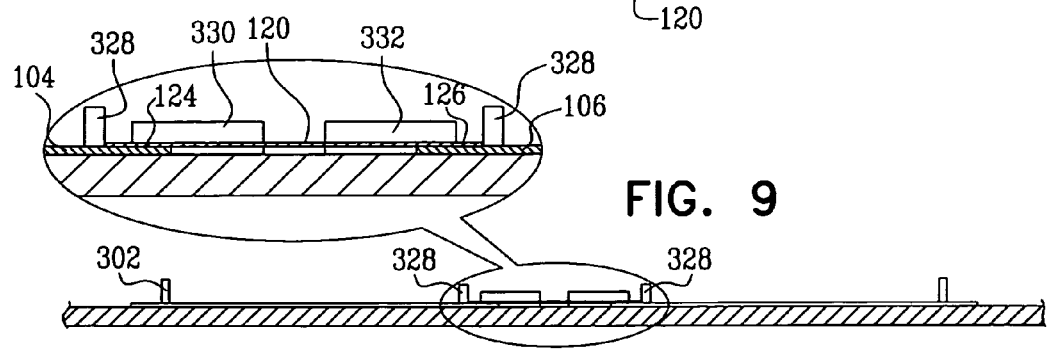

Reference is now made to FIG. 7, which is a simplified pictorial illustration of a further step in the method of manufacture of inlay structure 100 of FIGS. 1-3, and to FIGS. 8 and 9, which are, respectively, a plan view corresponding to FIG. 7 and a sectional illustration taken along lines IX-IX of FIG. 7. As seen in FIGS. 7-9, a strip of flexible web material 120, such as for example a PET based web strip, is placed over sheets 104 and 106 so as to overlie gap 108 and respective edges 124 and 126 of first and second sheets 104 and 106 of the inlay structure adjacent gap 108. The strip of flexible web material 120 preferably is retained in a desired position with sheets 104 and 106 by edge engagement with upstanding web material positioning pins 328, mounted on planar assembly surface 300 and arranged equidistantly from axis 109, and mutually spaced positioning protrusions 330 and 332, formed on planar assembly surface 300.

Figure 10:
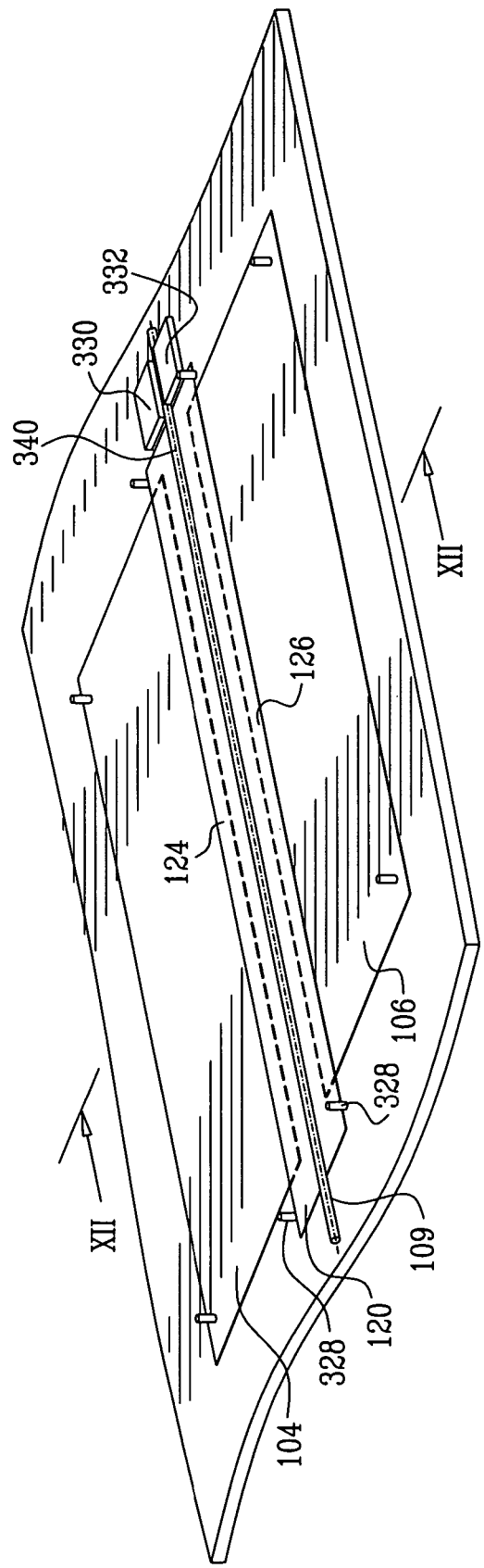
FIG. 10 is a simplified pictorial illustration of a still further step in the method of manufacture of the inlay structure of FIGS. 1-3.
Figure 11:
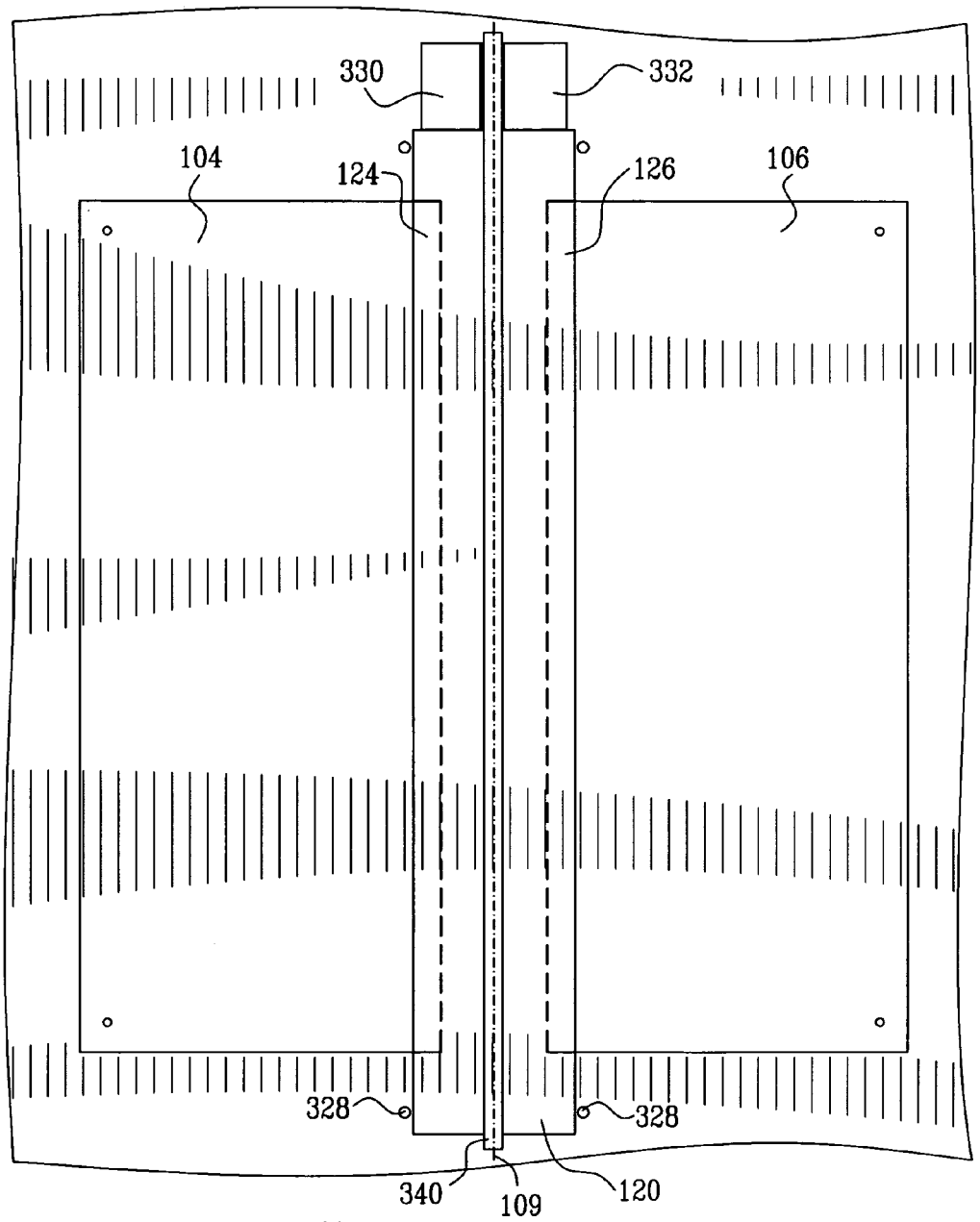
FIGS. 11 and 12 are, respectively, a plan view corresponding to FIG. 10 and a sectional illustration taken along lines XII-XII of FIG. 10.
Figure 12:
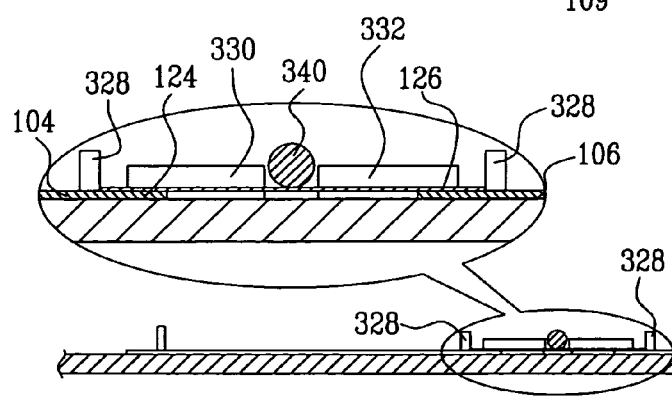

Reference is now made to FIG. 10, which is a simplified pictorial illustration of a still further step in the method of manufacture of inlay structure 100 of FIGS. 1-3, and to FIGS. 11 and 12, which are, respectively, a plan view corresponding to FIG. 10 and a sectional illustration taken along lines XII-XII of FIG. 10. As seen in FIGS. 10-12, a retaining rod 340 may be placed over the strip of flexible web material 120. Retaining rod 340 may be retained in a gap between adjacent protrusions 330 and 332 to lie along axis 109.

Figure 13:
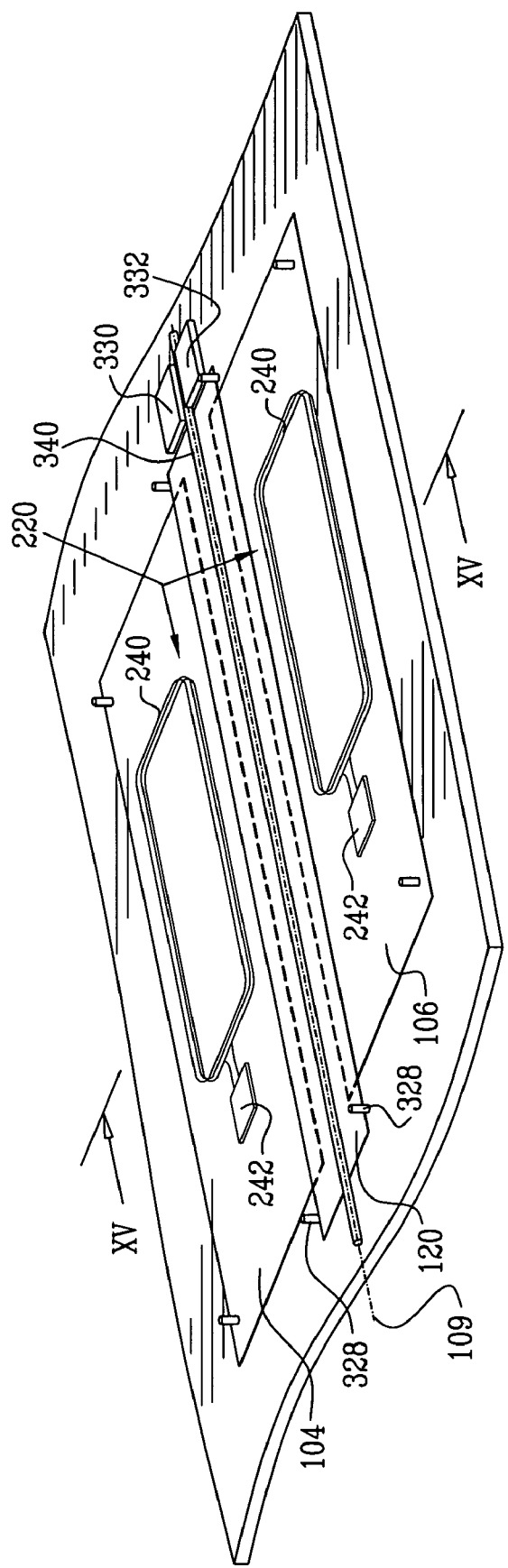
FIG. 13 is a simplified pictorial illustration of a yet further step in the method of manufacture of the inlay structure of FIGS. 1-3.

Reference is now made to FIG. 13, which is a simplified pictorial illustration of a yet further step in the method of manufacture of inlay structure 100 of FIGS. 1-3, and to FIGS. 14 and 15, which are, respectively, a plan view corresponding to FIG. 13 and a sectional illustration taken along lines XV-XV of FIG. 13. As seen in FIGS. 13-15, electronic identification circuitry 220 is associated with the inlay structure 100 in any suitable conventional manner, such as by printing or embedding it at least partially into or onto sheets 104 and/or 106 using a technique identical or similar to that described in any of the following U.S. Pat. Nos. 6,628,240; 6,626,364 and 6,604,686. As noted above, electronic identification circuitry 220 preferably includes wireless antenna 240 electrically connected to chip module 242 containing a smart card chip or any other suitable electronic circuitry.

Figure 16:
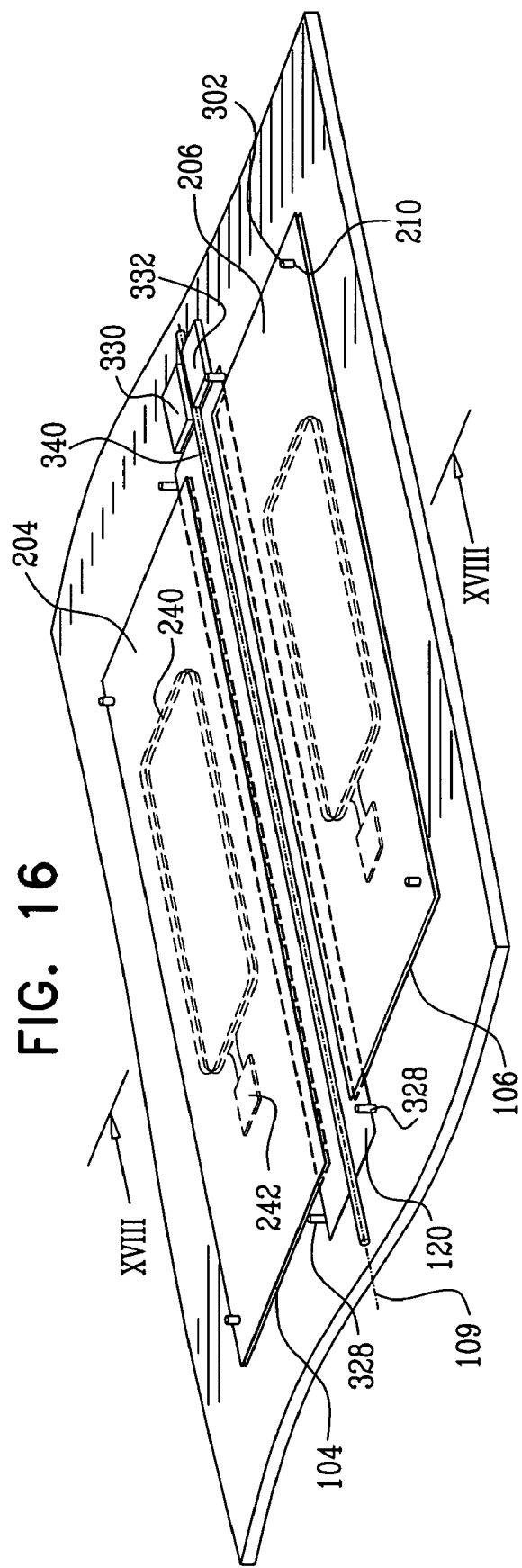
FIG. 16 is a simplified pictorial illustration of an additional step in the method of manufacture of the inlay structure of FIGS. 1-3.
Figure 17:
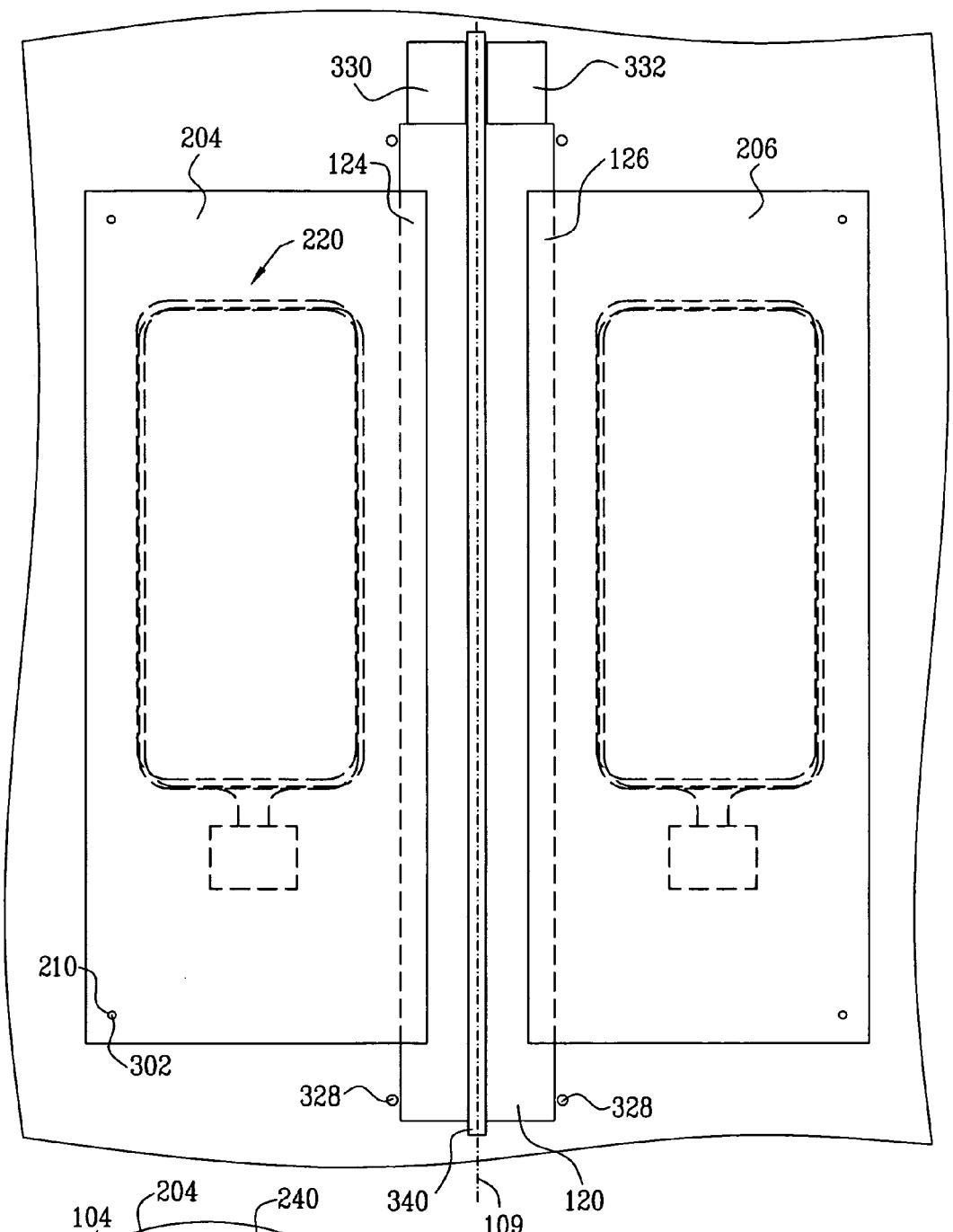
FIGS. 17 and 18 are, respectively, a plan view corresponding to FIG. 16 and a sectional illustration taken along lines XVIII-XVIII of FIG. 16.
Figure 18:
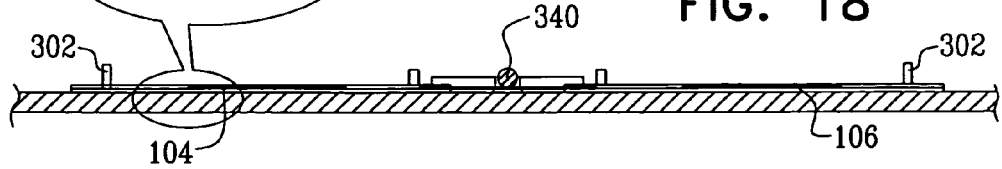

Reference is now made to FIG. 16, which is a simplified pictorial illustration of an additional step in the method of manufacture of inlay structure 100 of FIGS. 1-3, and to FIGS. 17 and 18, which are, respectively, a plan view corresponding to FIG. 16 and a sectional illustration taken along lines XVIII-XVIII of FIG. 16. As seen in FIGS. 16-18, third and fourth sheets 204 and 206, respectively, of an inlay substrate, such as coated paper, TESLIN®, PVC, polycarbonate, PET-G, PETF and ABS or any other suitable substrate, are arranged partially over flexible web material 120 and electronic identification circuitry 220 and in precise registration over corresponding sheets 104 and 106. The sheets 204 and 206 of the inlay substrate are preferably formed with perforations 210 at locations corresponding to those of upstanding positioning pins 302 and are located such that pins 302 extend through corresponding perforations 210, so as to provide precise registration of sheets 204 and 206 with respective first and second sheets 104 and 106 respectively.

Figure 19:
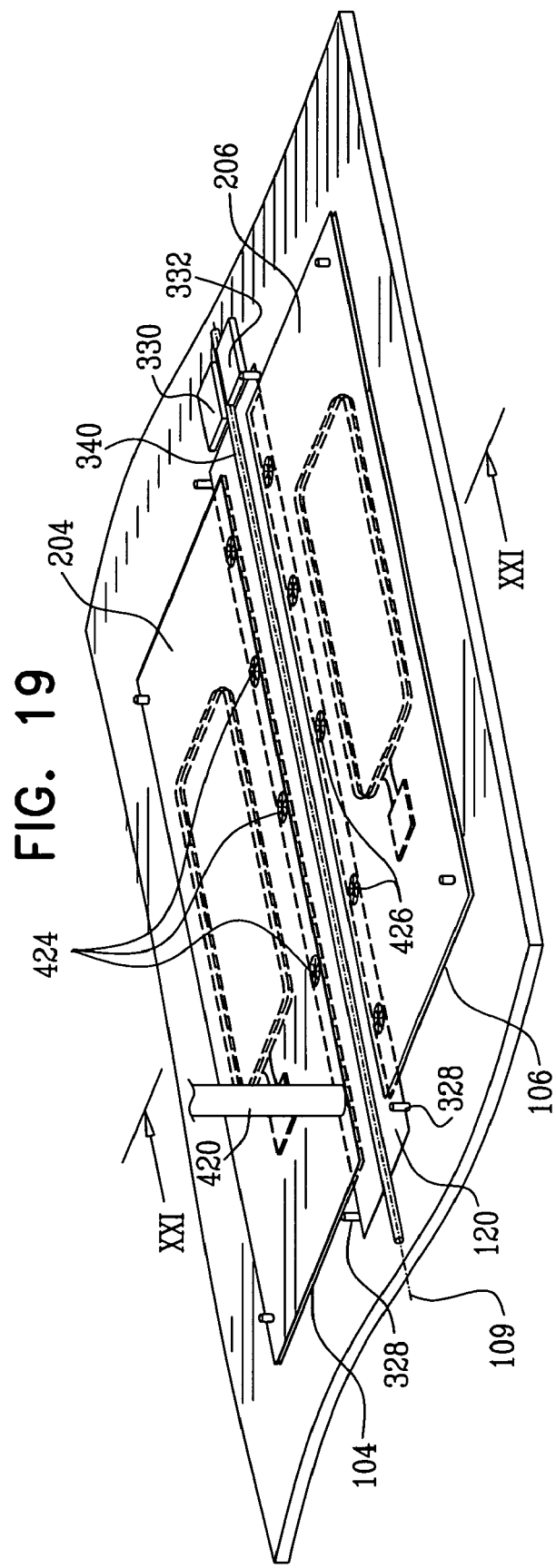
FIG. 19 is a simplified pictorial illustration of a further additional step in the method of manufacture of the inlay structure of FIGS. 1-3.
Figure 20:
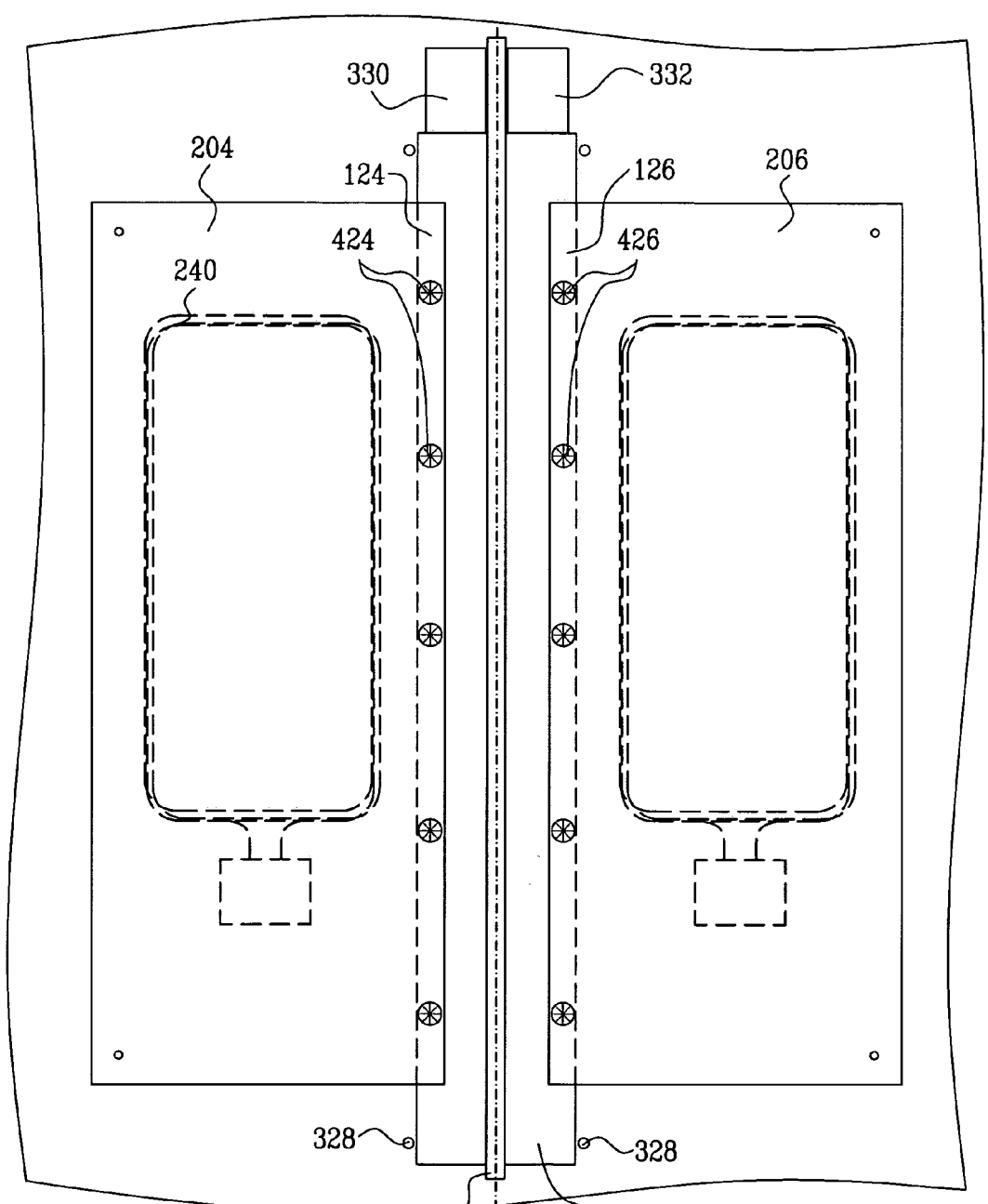
FIGS. 20 and 21 are, respectively, a plan view corresponding to FIG. 19 and a sectional illustration taken along lines XXI-XXI of FIG. 19.
Figure 21:
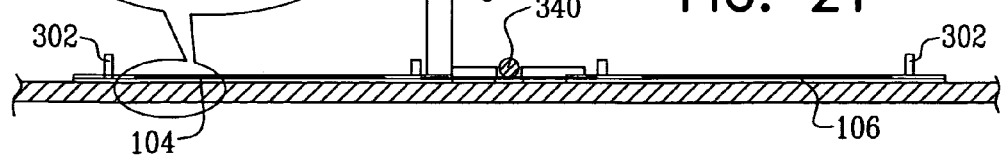

Reference is now made to FIGS. 19-21, which illustrate bonding, preferably by spot heat welding employing a heating element 420, the first and third sheets 104 and 204 together at locations 424 along edge 124 where they overlie the flexible web material 120 and similarly bonding the second and fourth sheets 106 and 206 together at locations 426 along edge 126 where they overlie the flexible web material 120.

Following the step shown in FIGS. 19-21, the bonded first, second, third and fourth sheets 104, 106, 204 and 206 and the web material 120 are then laminated together to create inlay structure 100 (FIG. 1).

According to an alternative embodiment of the invention, shown in FIGS. 22-31, the electronic identification circuitry 220 is located above one or both of sheets 204 and 206, by printing, embedding or any other suitable technique rather than being embedded at least partially into or onto sheets 104 and/or 106 as described hereinabove with reference to FIGS. 13-15. As noted above, electronic identification circuitry 220 preferably includes wireless antenna 240 electrically connected to chip module 242 containing a smart card chip or any other suitable electronic circuitry.

Figure 22:
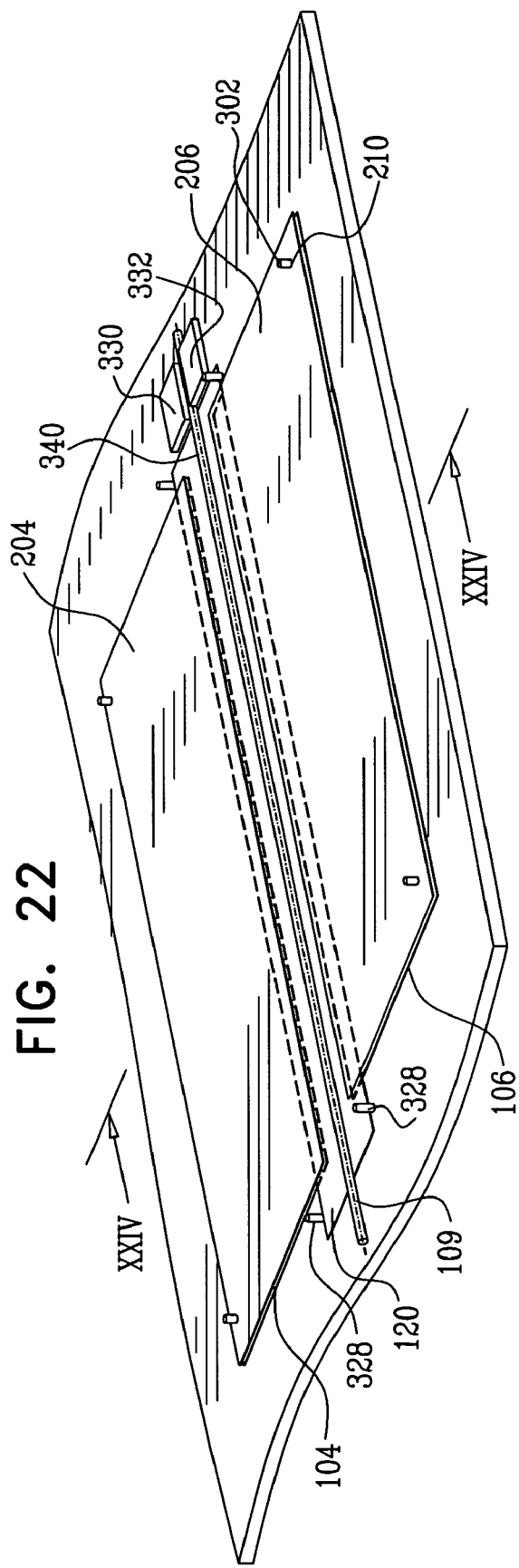
FIG. 22 is a simplified pictorial illustration of a step in the method of manufacture of an inlay structure, useful in an electronic identification product, in accordance with another preferred embodiment of the present invention.

In this alternative embodiment, preparation of inlay structure 100 proceeds as in the steps shown in FIGS. 4-12. The process then continues, as seen in FIGS. 22-24, by partially arranging third and fourth sheets 204 and 206, respectively, of an inlay substrate, such as coated paper, TESLIN®, PVC, polycarbonate, PET-G, PETF and ABS or any other suitable substrate, over flexible web material 120 in precise registration over corresponding sheets 104 and 106. The sheets 204 and 206 of the inlay substrate are preferably formed with perforations 210 at locations corresponding to those of upstanding positioning pins 302 and are located such that pins 302 extend through corresponding perforations 210, so as to provide precise registration of sheets 204 and 206 with respective first and second sheets 104 and 106 respectively.

Figure 25:
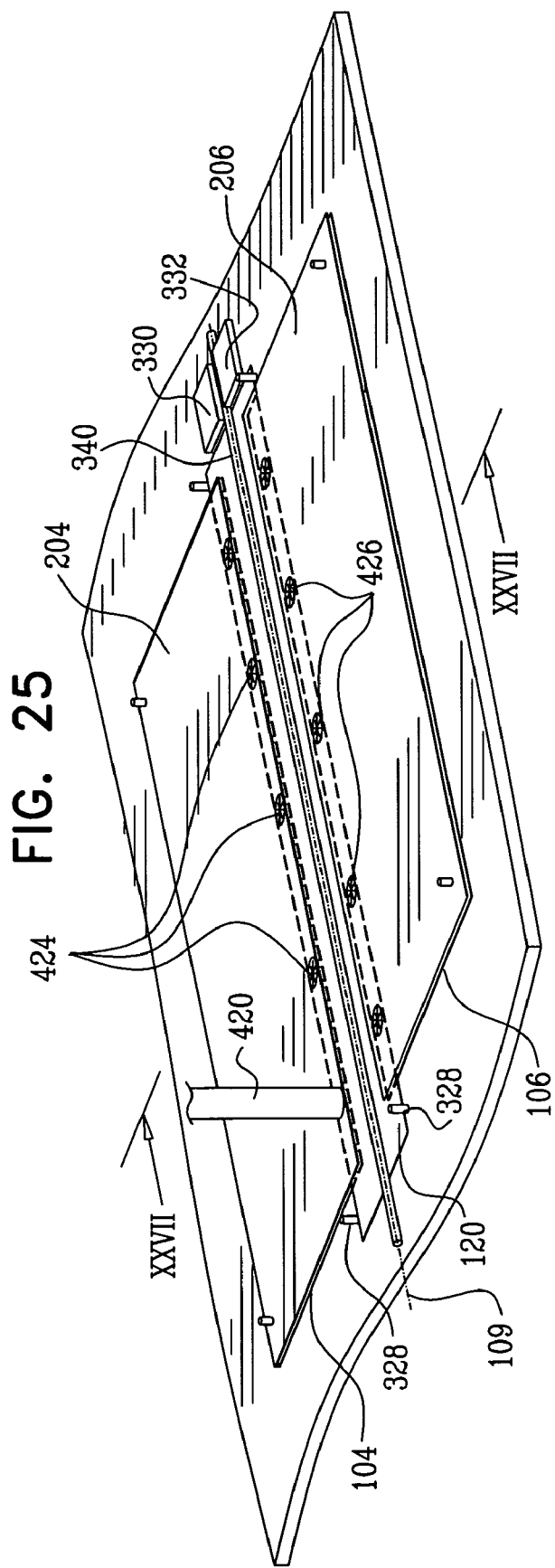
FIG. 25 is a simplified pictorial illustration of an additional step in the method of manufacture of the inlay structure of FIGS. 22-24.
Figure 26:
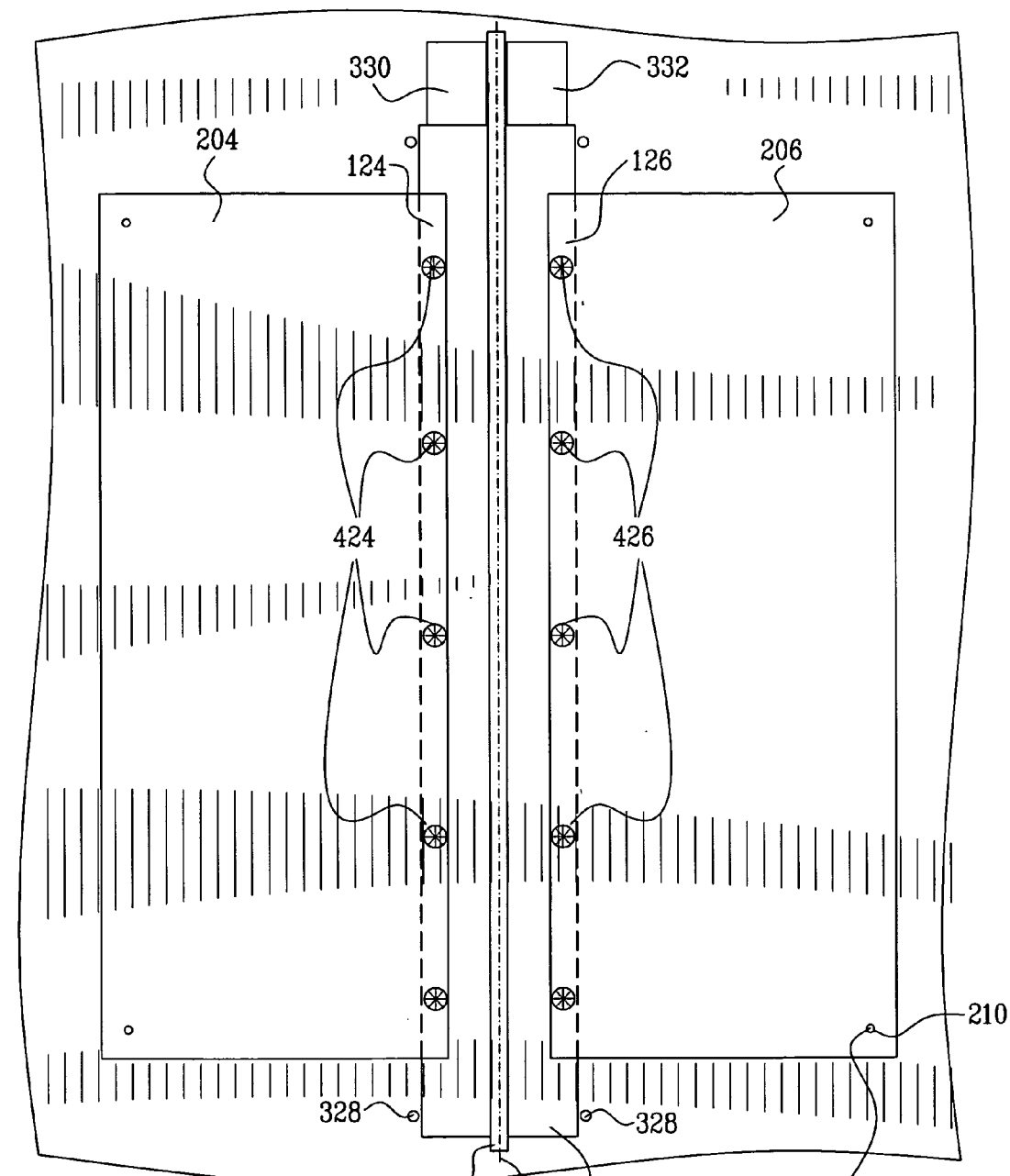
FIGS. 26 and 27 are, respectively, a plan view corresponding to FIG. 25 and a sectional illustration taken along lines XXVII-XXVII of FIG. 25.
Figure 27:
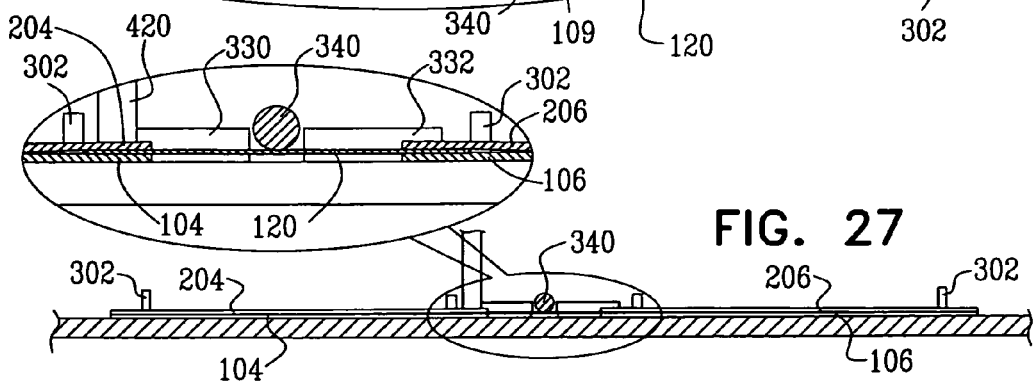

The process proceeds, as seen in FIGS. 25-27, with bonding, preferably by spot-heat welding employing heating element 420, the first and third sheets 104 and 204 together at locations 424 along edge 124 where they overlie the flexible web material 120 and similarly bonding the second and fourth sheets 106 and 206 together at locations 426 along edge 126 where they overlie the flexible web material 120.

Figure 28:
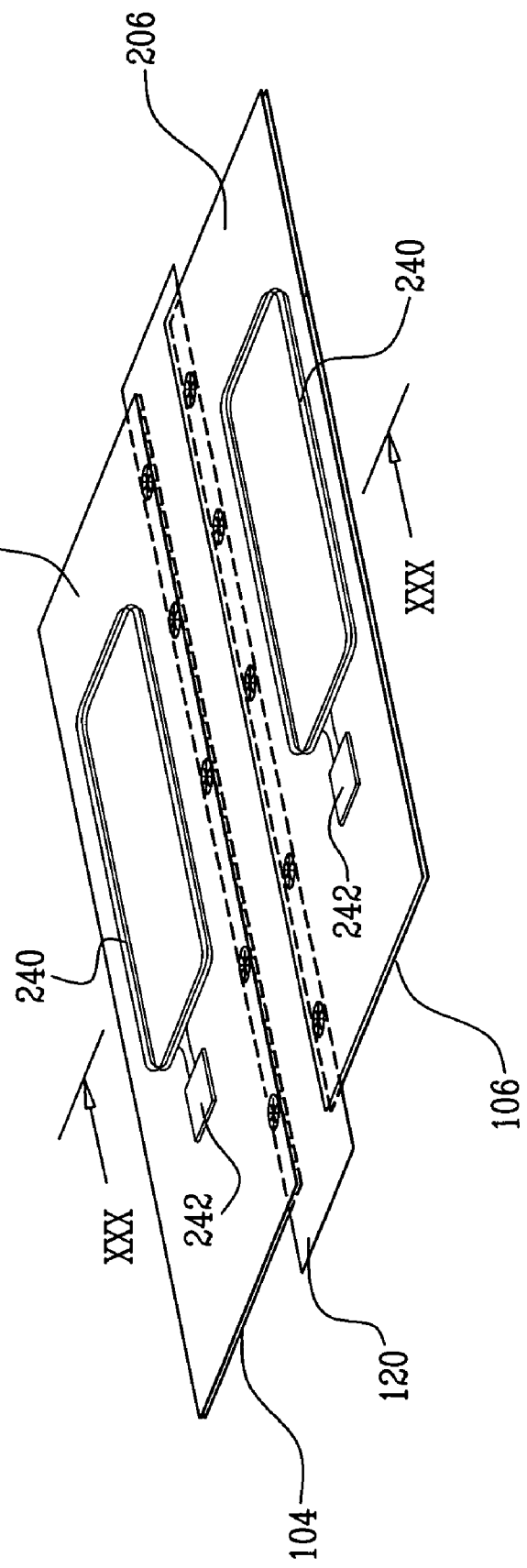
FIG. 28 is a simplified pictorial illustration of a final step in the method of manufacture of the inlay structure of FIGS. 22-27.
Figure 29:
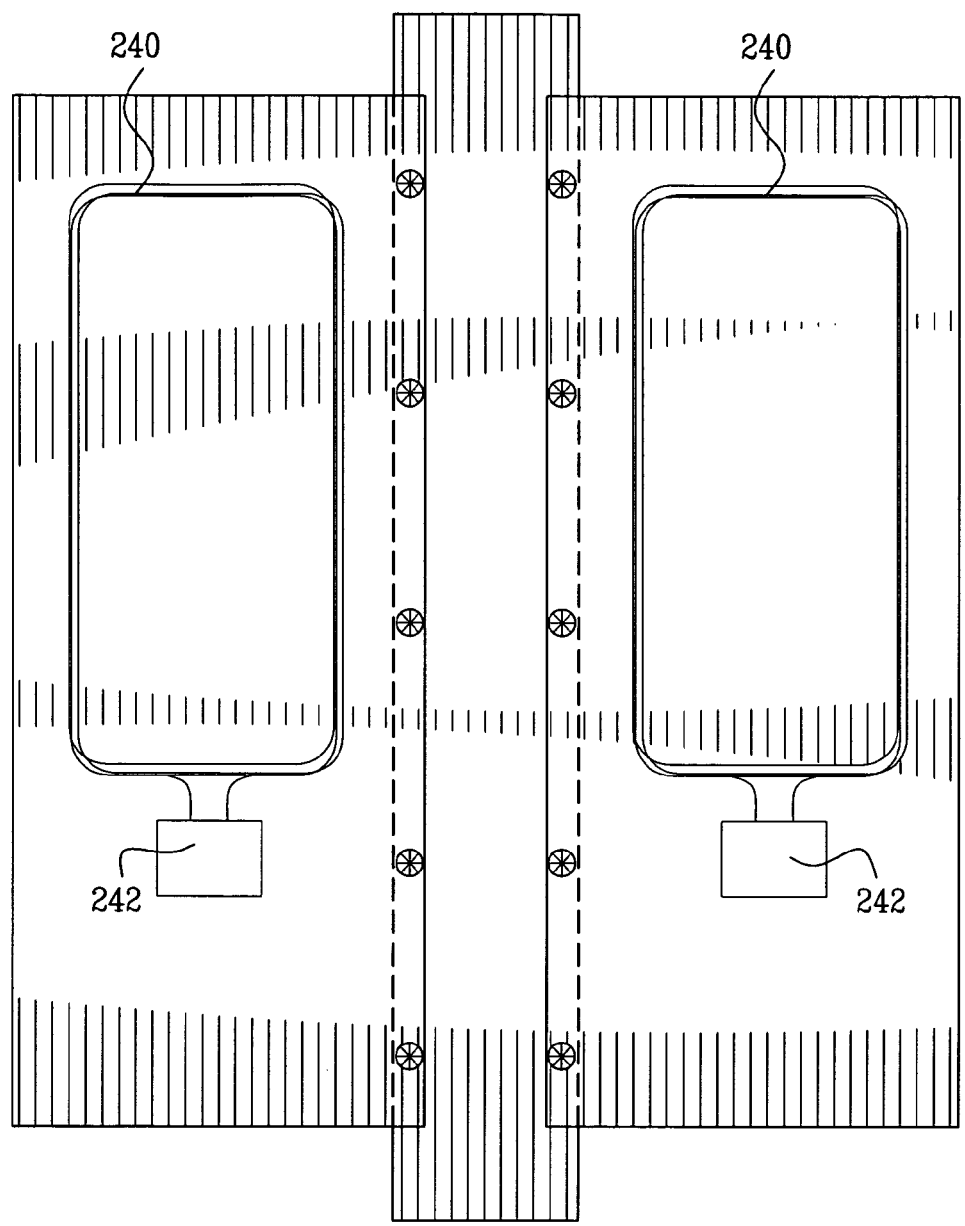
FIGS. 29 and 30 are, respectively, a plan view corresponding to FIG. 28 and a sectional illustration taken along lines XXX-XXX of FIG. 28.
Figure 30:

Finally, as seen in FIGS. 28-30, electronic identification circuitry 220 is associated with the inlay structure in any suitable conventional manner, such as by embedding it at least partially into or onto sheets 204 and/or 206 using a technique identical or similar to that described in any of the following U.S. Pat. Nos. 6,628,240; 6,626,364 and 6,604,686. As noted above, electronic identification circuitry 220 preferably includes wireless antenna 240 electrically connected to chip module 242 containing a smart card chip or any other suitable electronic circuitry.

Following the step shown in FIGS. 28-30, the bonded first, second, third and fourth sheets 104, 106, 204 and 206, the web material 120 and the electronic identification circuitry 220 are then laminated together to create inlay structure 100 (FIG. 1).

It is appreciated that although the illustrated embodiment, as seen particularly in FIGS. 13-15, shows embedding of the electronic identification circuitry 220 to inlay structure 100 following the placement of web material 120, electronic identification circuitry 220 may be embedded onto sheets 104 and/or 106 or otherwise associated therewith, such as by printing, prior to the placement of web material 120.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. An electronic inlay structure comprising:
    first and second sheets of an inlay substrate arranged in generally side to side, spaced parallel arrangement, having a gap therebetween;
    a flexible web material arranged to overlie said gap and edges of said first and second sheets of said inlay structure adjacent said gap;
    third and fourth sheets arranged in registration with said first and second sheets respectively, over said first and second sheets of said inlay substrate and partially over said flexible web material and bonded thereto;
    electronic circuitry associated with at least one of said first, second, third and fourth sheets; and
    lamination enclosing said first, second, third and fourth sheets, said electronic circuitry and said web material together to create said inlay structure.

2. An electronic inlay structure according to claim 1 and wherein said inlay substrate material is selected from the group consisting of coated paper, TESLIN®, PVC, polycarbonate, PET-G, PETF and ABS.

3. An electronic inlay structure according to claim 1 and wherein at least part of said electronic circuitry is located on any of said first, second, third and fourth sheets of said inlay substrate.

4. An electronic inlay structure according to claim 3 and wherein said electronic circuitry comprises at least one wireless communication antenna which is at least partially embedded in at least one of said first, second, third and fourth sheets.

5. An electronic inlay structure according to claim 1 and wherein said electronic circuitry comprises at least one wireless communication antenna which is at least partially embedded in at least one of said first, second, third and fourth sheets.

6. An electronic inlay structure according to claim 1 and wherein said electronic circuitry comprises a smart card chip providing identification functionality.

7. The electronic inlay structure of claim 1, wherein the first and second sheets are generally arranged coplanar and separated by the gap formed between the parallel adjacent edges thereof.

8. The electronic inlay structure of claim 1, wherein the third and fourth sheets are generally arranged coplanar over the first and second sheets.

9. A method of manufacture of an electronic inlay structure, the method comprising:
    arranging first and second sheets of an inlay substrate in generally side to side, spaced parallel arrangement, having a gap therebetween;
    arranging a flexible web material to overlie said gap and edges of said first and second sheets of said inlay structure adjacent said gap;
    arranging third and fourth sheets of an inlay substrate in registration with said first and second sheets respectively, over said first and second sheets of said inlay substrate and partially over said flexible web material;
    bonding said first and third sheets together at locations where they overlie said flexible web material;
    bonding said second and fourth sheets together at locations where they overlie said flexible web material;
    associating electronic identification circuitry with at least one of said first, second, third and forth sheets; and
    laminating said first, second, third and fourth sheets, said electronic circuitry and said web material together to create said inlay structure.

10. A method of manufacture according to claim 9 and wherein said inlay substrate material is selected from the group consisting of coated paper, TESLIN®, PVC, polycarbonate, PET-G, PETE and ABS.

* * * * *